United States Patent

Munshi

[11] Patent Number: 5,328,101
[45] Date of Patent: Jul. 12, 1994

[54] GAS TURBINE FUEL NOZZLE SEAL

[75] Inventor: Jonathan Munshi, Scotia, N.Y.

[73] Assignee: General Electric Company, Schenectady, N.Y.

[21] Appl. No.: 112,313

[22] Filed: Aug. 27, 1993

[51] Int. Cl.$^5$ .................. F02C 7/22; B05B 15/06
[52] U.S. Cl. .................. 239/600; 239/DIG. 4; 60/740; 277/111; 285/92
[58] Field of Search .................. 239/600, DIG. 4, 406; 277/111, 115, 201, 226; 285/92, 342, 343; 60/39, 31, 740, 742

[56] References Cited

U.S. PATENT DOCUMENTS

| 377,776 | 2/1888 | Putnan | 285/343 X |
|---|---|---|---|
| 2,358,408 | 9/1944 | McMurray | 277/111 |
| 2,422,214 | 6/1947 | Meyer et al. | 60/740 |
| 2,443,187 | 6/1948 | Hobbs | 277/115 X |
| 2,644,700 | 7/1953 | Woodling | 285/343 |
| 2,692,478 | 10/1954 | Hill | 60/39.31 X |
| 2,881,826 | 4/1959 | Spies, Jr. | 239/600 X |
| 4,365,758 | 12/1982 | Schaming | 239/600 X |
| 5,247,790 | 9/1993 | Donlan et al. | 60/742 X |

Primary Examiner—Andres Kashnikow
Assistant Examiner—William Grant
Attorney, Agent, or Firm—Nixon & Vanderhye

[57] ABSTRACT

A fuel nozzle (10) for a gas turbine includes an annular nozzle body (12) having a forward end with interior and exterior surfaces; a gas tip (14) having a forward fuel discharge end and a rearward mounting end, the rearward mounting end at least partially receivable in the forward end of the nozzle body (12); a resilient seal (38) inserted between the nozzle body (12) and the gas tip (14); a seal ring (26) mounted on the rearward mounting end of the gas tip (14), adapted to axially compress the resilient seal (38) when the seal ring (26) is engaged with the nozzle body (12); and a locking sleeve (48) on the exterior surface of the nozzle body (12) for locking the seal ring (26) to the gas tip (14).

13 Claims, 3 Drawing Sheets

GAS TURBINE FUEL NOZZLE SEAL

TECHNICAL FIELD

This invention relates to gas turbine fuel nozzle assemblies and, specifically, to a sealing arrangement between a fuel nozzle body and a fuel nozzle gas tip.

BACKGROUND AND SUMMARY OF THE INVENTION

Gas fuels with a high concentration of hydrogen (greater than 5% by volume) require special provisions to prevent the possibility of an explosion. One such provision is to weld the fuel nozzle gas tip to the fuel nozzle body to avoid any leakage of gas through the threaded interface. While providing a leak-tight joint, the welded tips make it difficult to perform any nozzle maintenance in the field. Removing the tips necessitates sending the fuel nozzle assemblies to an off-site service shop where the nozzle tips are machined off. This becomes an expensive and time-consuming proposition for the customer.

This invention provides a simple yet effective sealing arrangement for fuel nozzles used in high-hydrogen fuel applications.

In the exemplary embodiment disclosed herein, the fuel nozzle gas tip is provided with a threaded seal ring which, after the gas tip has been threaded into engagement with the fuel nozzle body, is movable axially rearwardly to axially and radially compress a resilient metallic O-ring between the gas tip and the nozzle body. In order to prevent the seal ring on the tip from moving axially forwardly (via rotation) during use, an annular locking sleeve is provided for locking the seal ring in place. The locking sleeve comprises a cylindrical sleeve provided with a plurality of axially extending tabs at its forwardmost end, in circumferentially spaced relationship. These tabs are adapted to protrude forwardly through axial slots spaced in a similar manner about the circumference of the seal ring, when the seal ring is moved rearwardly into engagement with the nozzle body. The nozzle body itself is also provided with a plurality of circular recesses spaced circumferentially about its forward end. After the seal ring is fully engaged with the nozzle body, with the resilient metallic seal compressed therebetween, the forwardmost tabs of the locking sleeve, having been received within the circumferentially spaced axial slots the seal ring, are bent radially inwardly, and the rearward portion of the locking sleeve is staked to the circumferentially spaced recesses on the nozzle body. As a result, the locking ring is prevented from moving rotationally or axially relative to the gas tip. Furthermore, the gas tip is also prevented from rotation.

In its broadest aspects, therefore, the invention relates to a fuel nozzle for a gas turbine comprising an annular nozzle body having a forward end with interior and exterior surfaces; a gas tip having a forward fuel discharge end and a rearward mounting end, the rearward mounting end at least partially receivable in the forward end of the nozzle body; a resilient seal inserted between the nozzle body and the gas tip; a seal ring mounted on the rearward mounting end of the gas tip, adapted to axially compress the resilient seal when the seal ring is engaged with the nozzle body; and means on the exterior surface of the nozzle body for locking the seal ring to the gas tip.

The presently disclosed invention thus provides good sealing for high-hydrogen fuel gas tips while offering a design that is field maintainable. Furthermore, by using an adjustable seal ring, reliable sealing performance is achieved, regardless of variable stack-up between the gas tip and the body from assembly to assembly.

Additional objects and advantages of the present invention will become apparent from the detailed description which follows.

BEST MODE FOR CARRYING OUT THE INVENTION

Figure 1:
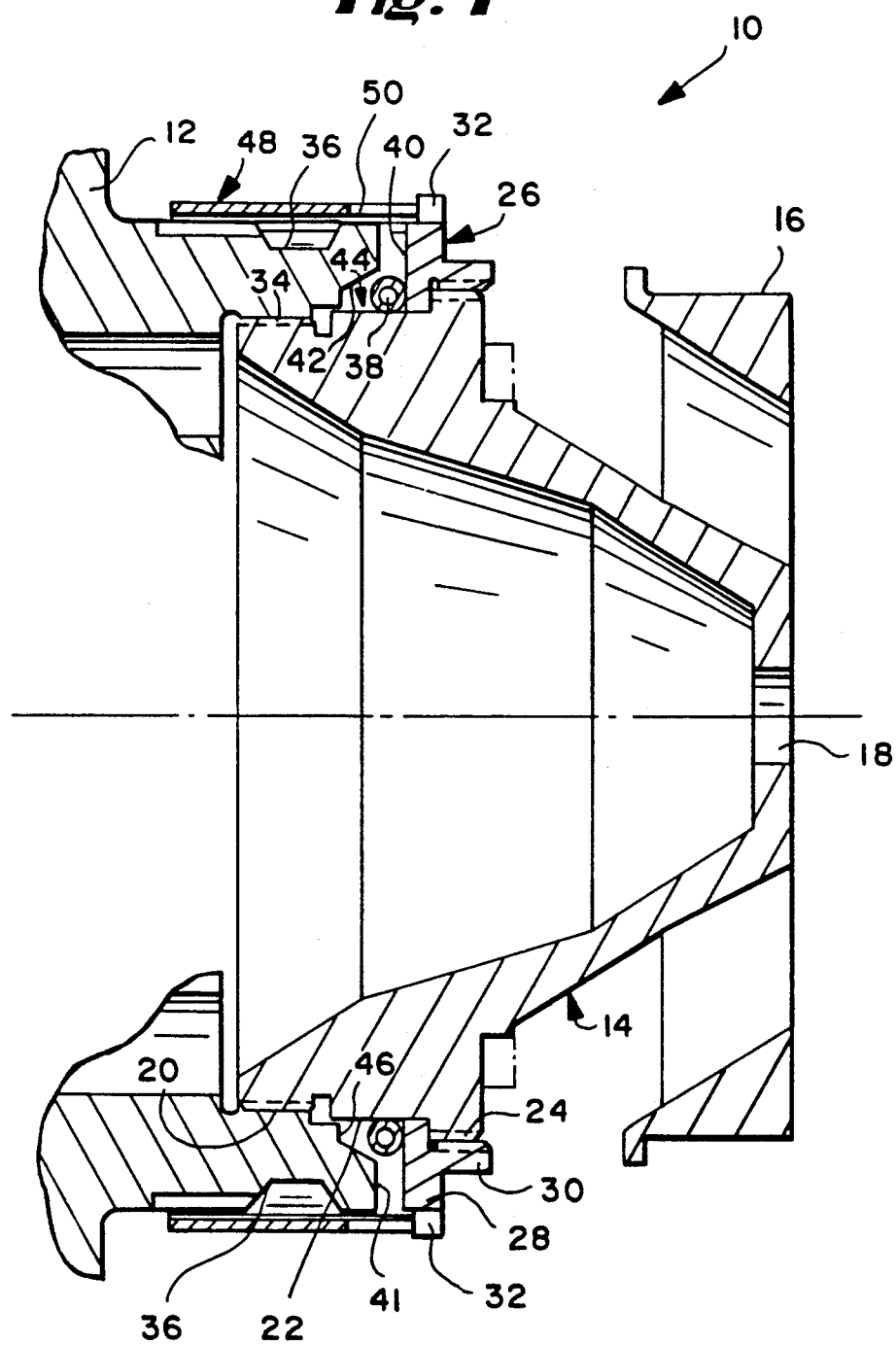
FIG. 1 is a partial side section of a fuel nozzle body and associated gas tip incorporating a sealing arrangement in accordance with this invention, with a seal ring element shown in a non-operative position.

The fuel nozzle 10 shown in the Figures is only partially shown, with a major portion of the nozzle body 12 and internal components thereof omitted for the sake of simplicity and clarity. It will be understood that the internal parts and the manner of operation of the fuel nozzle form no part of this invention. Rather, this invention is concerned with the manner of connection of the gas tip of the nozzle to the nozzle body as described in greater detail below.

The external or outer fuel nozzle 10 includes the generally cylindrical nozzle body 12 and an annular gas tip 14. The gas tip 14 may include a conventional air swirler 16 and a fuel discharge orifice 18. The annular gas tip 14 is formed at its rearward (upstream of the orifice 18) mounting end with an externally threaded annular surface 20, a smooth annular seal seating surface 22 and a forward externally threaded annular surface 24.

A seal ring 26 includes a rearward radial flange portion 28 and a forward axially threaded portion 30. The latter has screw threads formed on its inner surface for mating engagement with the threaded surface 24 of the gas tip. The radial flange portion 28 is provided with a plurality of axially projecting, circumferentially spaced slots 32 for reasons explained below. It should also be apparent from the Figures that the adjacent outer diameters of the nozzle body 12 and radial flange portion 28 are substantially identical, at least at the forwardmost end of the nozzle body. The nozzle body 10 is formed with an internally threaded portion 34 for mating engagement with threaded portion 20 of the gas tip. The external surface of the nozzle body is also provided with a plurality of circumferentially spaced dimples 36 (1 shown).

An annular or circular metal O-ring seal 38 is provided for seating engagement on the surface 22 of the nozzle tip, axially between the seal ring 26 and the nozzle body 12. More specifically, the seal 38 is arranged for abutting engagement with radial surface 40 of the seal ring. At the same time, the forwardmost edge 41 of the nozzle body 12 is formed with an annular recess 44 defined by rearwardly and inwardly tapered surface 42 and an adjacent radial surface 46. As will be described in more detail below, surface 40 of seal ring 26 is adapted to abut the forwardmost edge 41 of the nozzle body 12, with the seal 38 radially wedged in the recess 44.

Figure 4:
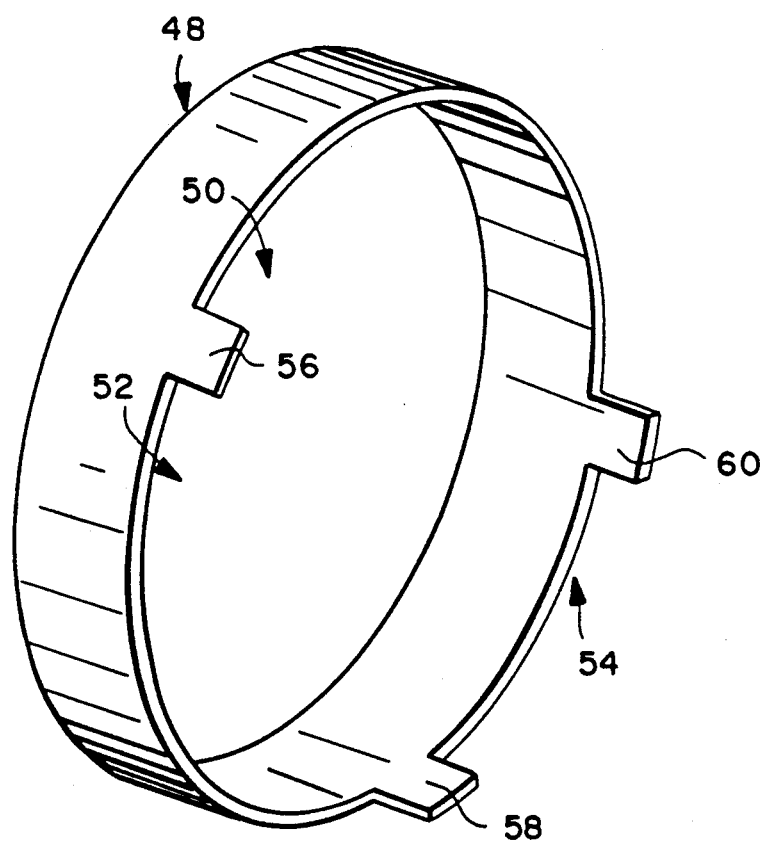
FIG. 4 is a perspective view of the locking sleeve in accordance with the invention.

An annular locking plate or sleeve 48 is sized to slidably fit over the nozzle body 12 and radial flange portion 28 at the substantially uniform diameter interface therebetween. The locking plate or sleeve 48 is slotted at its forward end in areas 50, 52 and 54 (see FIG. 4) to thereby provide three forwardly projecting tabs 56, 58 and 60. The function of this sleeve 48 is described in greater detail below.

To assemble the gas tip 14 to the nozzle body 12, the following manipulative steps are required:

(a) The gas tip 14 and the seal ring 26 are assembled together by threading the seal ring 26 onto the gas tip 14, and a resilient metallic O-ring 38 is arranged on the gas tip 14 axially behind the sealing ring 26.

(b) With the sleeve 48 telescoped over the forward end of the nozzle body 12 as shown in FIG. 1, the subassembly of the gas tip 14, seal ring 26 and resilient metallic O-ring 38 is threaded into the fuel nozzle body 12 until the gas tip contacts the fuel nozzle outer tip (not shown) at the gas tip forwardmost inner radial surface.

(c) Once the gas tip 14 has bottomed out on the fuel nozzle outer tip, the seal ring 26 is rotated into the nozzle body 12, i.e., axially rearwardly, pushing the resilient seal 38 into the tapered recess 44 provided at the forwardmost end of the nozzle body 12. With continued rotation of the seal ring 26, the seal 38 is compressed into the wedge-like recess 44 between the nozzle body 12, the gas tip 14 and the rearward radial surface 40 of tile seal ring 26. The deformed seal 38 now pushes firmly against the tapered surface 42 of the fuel nozzle body as well as the outer radius (seating surface) 22 of the gas tip 14, thereby providing an effective seal between the gas tip and the fuel nozzle body, as shown in FIG. 2.

Figure 2:
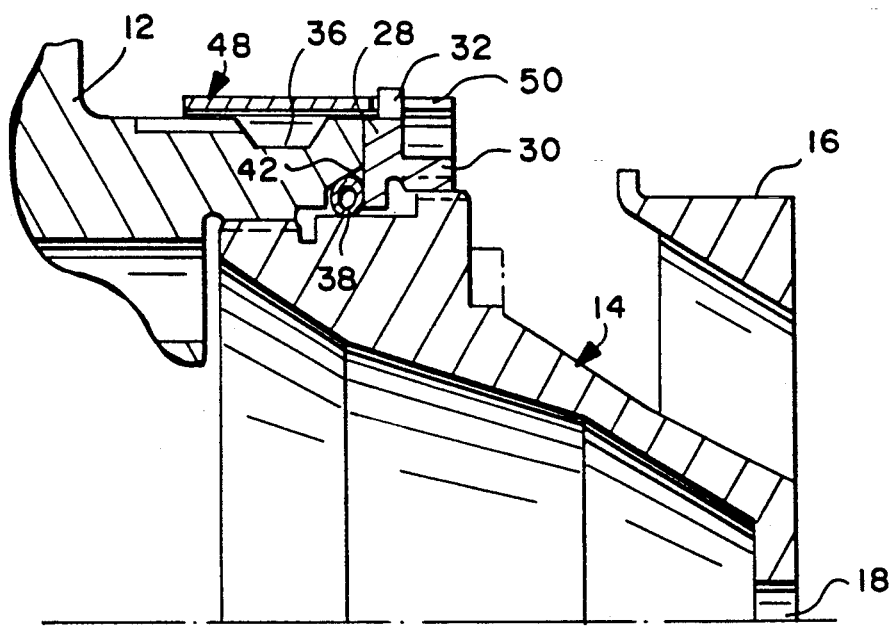
FIG. 2 is a partial side section, similar to FIG. 1 but illustrating the seal ring in operative position fully engaged with the nozzle body.
Figure 3:
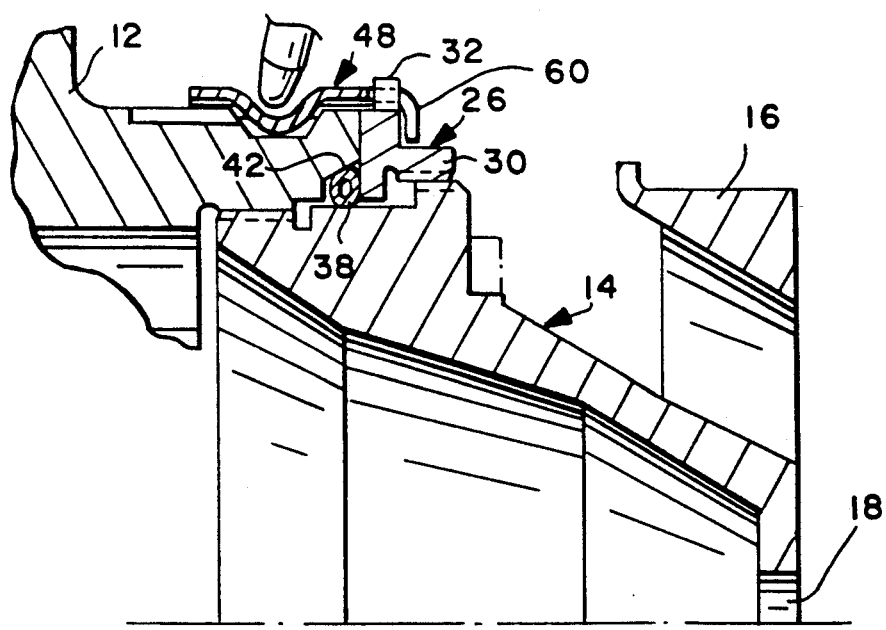
FIG. 3 is a partial section similar to FIG. 2 but illustrating a sleeve deformed into locking engagement with both the seal ring and the nozzle body.

(d) Finally, the locking plate or sleeve 48 is moved forwardly over the locking ring 26, with tabs 56, 58, and 60 extending forward through slots 32 on seal ring 26 until the forward facing radial surfaces 50, 52 and 54 of locking sleeve 48 have butted up against rearward facing surface 40 of seal ring 26, as also shown in FIG. 2. The tabs 56, 58 and 60 of the locking sleeve are then bent radially inwardly as best illustrated in FIG. 3 and, at the same time, rearward portions of the locking sleeve 48 are staked within the recesses 36 provided in the nozzle body. As a result, the locking ring 26 and the gas tip 14 are precluded from relative rotation and hence axial separation. Thus, the clamping load on the seal 38 is maintained indefinitely.

Disassembly is carried out by reversing the above described procedure. It will be readily apparent that the gas tip 14 can be assembled and disassembled from the fuel nozzle body 12 in the field any number of times. Only the seal 38 and the locking sleeve 48 are not reusable.

It should further be appreciated that the O-ring 38 is specified here as a metallic O-ring since the fuel nozzle temperature is too high for traditional O-ring materials (for example, Viton, fluorosilicones, etc.). However, the invention as described herein is not limited by the type of seals used. Other configurations such as a C-seal, a spring-energized metal seal, BOSS seal, etc. may also be used.

While the invention has been described with respect to what is presently regarded as the most practical embodiments thereof, it will be understood by those of ordinary skill in the art that various alterations end modifications may be made which nevertheless remain within the scope of the invention as defined by the claims which follow.

What is claimed is:

1. A fuel nozzle for a gas turbine comprising:
   an annular nozzle body having a forward end with interior and exterior surfaces;
   a gas tip having a forward fuel discharge end and a rearward mounting end, the rearward mounting end at least partially receivable in said forward end of said nozzle body;
   a resilient seal inserted between said nozzle body and said gas tip;
   a seal ring mounted on said rearward mounting end of said gas tip, adapted to axially compress said resilient seal when the seal ring is engaged with said nozzle body; and
   means on said exterior surface of said nozzle body for locking said seal ring to said gas tip.

2. The fuel nozzle of claim 1 wherein said resilient seal comprises a metal O-ring.

3. The fuel nozzle of claim 1 wherein said seal ring is threadably secured on said gas tip for axial movement toward and away from said nozzle body.

4. The fuel nozzle of claim 3 wherein a forwardmost end of said nozzle body is provided with a tapered recess and wherein said resilient seal is radially and axially compressed within said recess when said seal ring is moved into engagement with said forwardmost end of said nozzle body.

5. The fuel nozzle of claim 1 wherein said locking means comprises an annular sleeve including a plurality of radially bendable tabs circumferentially spaced about a forward end of said sleeve.

6. The fuel nozzle of claim 5 wherein said bendable tabs extend axially forward of said sleeve.

7. The fuel nozzle of claim 6 wherein said seal ring is provided with a plurality of circumferentially spaced, axial slots, each slot adapted to accept a corresponding one of said bendable tabs on the locking sleeve.

8. The fuel nozzle of claim 7 wherein said nozzle body is provided with a plurality of circumferentially spaced recesses underlying said annular sleeve and, adapted to receive dimpled portions of said annular sleeve.

9. A method of assembling a gas tip to a fuel nozzle body in a fuel nozzle wherein the fuel nozzle comprises:
   an annular nozzle body having a forward end with interior and exterior surfaces;
   a gas tip having a forward fuel discharge end and a rearward mounting end, the rearward mounting end at least partially receivable in said forward end of said nozzle body;
   a resilient seal inserted between said nozzle body and said gas tip;
   an adjustable seal ring mounted on said rearward mounting end of said gas tip, adapted to axially compress said resilient seal when the seal ring is engaged with said nozzle body;
   a) attaching the seal ring to the gas tip;
   b) attaching the resilient seal to the gas tip axially behind the seal ring;
   c) attaching the gas tip, seal ring and resilient seal to the nozzle body; and d) moving the seal ring rearwardly to engage the nozzle body with the resilient seal axially compressed therebetween.

10. The method of claim 9 and including, during step c), radially compressing the resilient seal.

11. The method of claim 9 and including the step of:
e) providing an annular locking sleeve on said nozzle body prior to step c) and, after step d), deforming a portion of the annular locking sleeve about said seal ring to thereby lock the seal ring to the nozzle body, thereby preventing axial forward movement of the seal ring, and the gas tip.

12. The method of claim 11 wherein circular recesses are provided in circumferentially spaced locations shout the forward end of the nozzle body, and wherein step e) includes the step of staking said annular sleeve in said recesses.

13. The method of claim 11 wherein said seal ring is provided with a plurality of circumferentially spaced axial slots, and said annular sleeve is provided with a plurality of correspondingly circumferentially spaced axial tabs, and wherein step e) includes seating the tabs in the slots.

* * * * *